(12) United States Patent
Yamakawa

(10) Patent No.: US 9,764,599 B2
(45) Date of Patent: Sep. 19, 2017

(54) PNEUMATIC TIRE

(71) Applicant: The Yokohama Rubber Co., LTD., Minato-ku, Tokyo (JP)

(72) Inventor: Takahiro Yamakawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/916,964

(22) PCT Filed: Aug. 27, 2014

(86) PCT No.: PCT/JP2014/072458
§ 371 (c)(1),
(2) Date: Mar. 4, 2016

(87) PCT Pub. No.: WO2015/033839
PCT Pub. Date: Mar. 12, 2015

(65) Prior Publication Data
US 2016/0214438 A1    Jul. 28, 2016

(30) Foreign Application Priority Data

Sep. 4, 2013  (JP) .................................. 2013-183012

(51) Int. Cl.
*B60C 11/01*  (2006.01)
*B60C 11/03*  (2006.01)
*B60C 11/12*  (2006.01)

(52) U.S. Cl.
CPC .......... *B60C 11/0332* (2013.01); *B60C 11/01* (2013.01); *B60C 11/0306* (2013.01);
(Continued)

(58) Field of Classification Search
CPC .................................................... B60C 11/01
See application file for complete search history.

(56) References Cited

U.S. PATENT DOCUMENTS

| | | | | |
|---|---|---|---|---|
| 4,915,150 A | * | 4/1990 | Takusagawa | B60C 11/01 |
| | | | | 152/209.16 |
| 5,205,879 A | * | 4/1993 | Seitz | B60C 11/11 |
| | | | | 152/209.24 |

(Continued)

FOREIGN PATENT DOCUMENTS

| | | | |
|---|---|---|---|
| CN | 102310727 | | 1/2012 |
| JP | 06-127217 | * | 5/1994 |

(Continued)

OTHER PUBLICATIONS

English machine translation of JP2001-294018, no date.*
(Continued)

*Primary Examiner* — Robert Dye
(74) *Attorney, Agent, or Firm* — Thorpe North & Western

(57) ABSTRACT

In a pneumatic tire, shoulder blocks are formed with one of two types of values for block width measured in the tire circumferential direction. A cross-sectional shape of a tread ground contact edge of the shoulder blocks with the smaller block width value when sectioned in a plan that includes a tire axial center is formed with a squared portion formed by a curved line having a radius of curvature of 10 mm or less, or is formed with a squared portion taper cut along a straight line having a length of 10 mm or less. A cross-sectional shape of a tread ground contact edge of the shoulder blocks with the larger block width value when sectioned in the plan that includes the tire axial center is formed with a rounded portion formed by a curved line having a radius of curvature of from 30 mm to 60 mm inclusive.

7 Claims, 3 Drawing Sheets

(52) U.S. Cl.
CPC . *B60C 2011/039* (2013.01); *B60C 2011/0341* (2013.01); *B60C 2011/0365* (2013.01); *B60C 2011/0395* (2013.01); *B60C 2011/1209* (2013.01)

(56) References Cited

U.S. PATENT DOCUMENTS

| | | |
|---|---|---|
| 2012/0006457 A1 | 1/2012 | Miyazaki |
| 2013/0075001 A1 | 3/2013 | Yasunaga |

FOREIGN PATENT DOCUMENTS

| | | | |
|---|---|---|---|
| JP | H08-0127206 | | 5/1996 |
| JP | 2000-006616 | | 1/2000 |
| JP | 2001-294018 | * | 10/2001 |
| JP | 2008-195100 | | 8/2008 |
| JP | 2008-285056 | | 11/2008 |
| JP | 2013-028281 | | 2/2013 |
| JP | 2013-039899 | | 2/2013 |
| JP | 2013-067353 | | 4/2013 |
| WO | WO 2008/096498 | | 8/2008 |

OTHER PUBLICATIONS

English machine translation of JP2008-285056, no date.*
International Search Report for International Application No. PCT/JP2014/072458 dated Dec. 2, 2014, 3 pages, Japan.

* cited by examiner

| | Conventional Example | Working Example 1 | Working Example 2 | Working Example 3 | Working Example 4 | Working Example 5 | Working Example 6 | Working Example 7 |
|---|---|---|---|---|---|---|---|---|
| Number of types of block width values | 3 | 2 | 2 | 3 | 3 | 3 | 3 | 3 |
| Number of blocks | 70 | 70 | 70 | 70 | 70 | 70 | 70 | 70 |
| Block width W (mm) | 25/28/31 | 24/32 | 24/24/32 | 24/28/32 | 24/28/32 | 23/28/33 | 24/28/32 | 24/28/32 |
| Block width ratio Lmax/Lmin | 1.24 | 1.33 | 1.33 | 1.33 | 1.33 | 1.43 | 1.33 | 1.33 |
| Radius of curvature SHR (mm) | 2/2/2 (All squared) | 5/30 | 5/5/30 | 5/15/30 | 5/15/35 | 5/20/40 | 5/7/30 | 5/30/35 |
| Ground contact surface area ratio A2/A1 | 1.115 | 1.0 | 1.0 | 1.0 | 1.04 | 1.05 | 1.0 | 1.0 |
| Braking on snow | 102% | 100% | 100% | 100% | 100% | 100% | 100% | 100% |
| Rut performance | 94% | 100% | 102% | 102% | 102% | 102% | 102% | 102% |
| Pattern noise (P/N) | 100% | 100% | 100% | 100% | 100% | 103% | 100% | 100% |
| Uniformity (UF) | 102% | 103% | 105% | 105% | 107% | 109% | 105% | 105% |

FIG. 3

PNEUMATIC TIRE

TECHNICAL FIELD

The present technology relates to a pneumatic tire, and more particularly to an all-season tire.

BACKGROUND ART

All-season tires are expected to have tire performance adapted for use on various road surface conditions such as dry road surfaces, wet road surfaces, and snowy road surfaces.

Various such all-season tires have been proposed including all-season tires whereby traction performance on snow is enhanced while maintaining wet performance, and all-season tires with balanced snow and dry performance.

In recent years, enhancements in vehicle quietness have also lead to enhancements in tire uniformity in all-season tires being demanded.

SUMMARY

The present technology provides a pneumatic tire whereby uniformity can be enhanced while maintaining performance on snow.

The present technology is a pneumatic tire comprising:

a shoulder circumferential main groove extending in a tire circumferential direction in a tread surface of the tire;

a plurality of shoulder lateral grooves disposed to an outer side of the shoulder circumferential main groove in a tire width direction at intervals in the tire circumferential direction and extending in the tire width direction; and a plurality of shoulder blocks arranged in the tire circumferential direction and constituting a shoulder portion of a tread portion, each of the shoulder blocks being sandwiched by adjacent shoulder lateral grooves in the tire circumferential direction.

Such a pneumatic tire is characterized by:

the plurality of shoulder blocks being formed with two types of differing values for a block width measured in the tire circumferential direction;

the shoulder blocks of the differing block widths being alternately disposed in the tire circumferential direction in a certain order;

a cross-sectional shape of a tread ground contact edge of the shoulder blocks with the smaller block width value when sectioned in a plan that includes a tire axial center being formed with a squared portion formed by a curved line having a radius of curvature of 10 mm or less, or being formed with a squared portion taper cut along a straight line having a length of 10 mm or less;

a cross-sectional shape of a tread ground contact edge of the shoulder blocks with the larger block width value when sectioned in the plan that includes the tire axial center being formed with a rounded portion formed by a curved line having a radius of curvature of from 30 mm to 60 mm both inclusive; and the tread ground contact edge of the squared portion being positioned further to the outer side in the tire width direction than the tread ground contact edge of the rounded portion.

In addition, the present technology is a pneumatic tire comprising:

a shoulder circumferential main groove extending in a tire circumferential direction in a tread surface of the tire;

a plurality of shoulder lateral grooves disposed to an outer side of the shoulder circumferential main groove in a tire width direction at intervals in the tire circumferential direction and extending in the tire width direction; and a plurality of shoulder blocks arranged in the tire circumferential direction and constituting a shoulder portion of a tread portion, each of the shoulder blocks being sandwiched by adjacent shoulder lateral grooves in the tire circumferential direction.

Such a pneumatic tire is characterized by:

the plurality of shoulder blocks being formed with any one of three or more types of values for a block width measured in the tire circumferential direction, the three or more types including a smaller block width value, a larger block width value, and one or more types of values between the smaller and larger values;

a cross-sectional shape of a tread ground contact edge of the shoulder blocks with the smaller block width value when sectioned in a plan that includes a tire axial center being formed with a squared portion formed by a curved line having a radius of curvature of 10 mm or less;

a cross-sectional shape of a tread ground contact edge of the shoulder blocks with the larger block width value when sectioned in the plan that includes the tire axial center being formed with a rounded portion formed by a curved line having a radius of curvature of from 30 mm to 60 mm both inclusive;

a cross-sectional shape of a tread ground contact edge of the shoulder blocks with the intermediate block width value when sectioned in the plan that includes the tire axial center being formed by a curved line having a radius of curvature both larger than the radius of curvature of the squared portion and smaller than the radius of curvature of the rounded portion;

the tread ground contact edge of the squared portion being positioned further to the outer side in the tire width direction than the tread ground contact edge of the rounded portion;

the tread ground contact edge of the shoulder blocks with the intermediate block width value being positioned both further to an inner side in the tire width direction than the ground contact edge of the squared portion and further to the outer side in the tire width direction than the ground contact edge of the rounded portion; and the plurality of shoulder blocks being disposed so that the radius of curvature of the curved line that forms the cross-sectional shape of the tread ground contact edge of the shoulder blocks when sectioned in the plan that includes the tire axial center and the position of the tread ground contact edge in the tire width direction change in a stepwise manner in the tire circumferential direction.

The present technology aims to enhance performance on snow and rut performance by using both the squared portions that ensure the length of the shoulder lateral grooves and the rounded portion that are superior in anti-tramlining properties.

Moreover, by providing the squared portion in the shoulder blocks with the smaller block width and providing the rounded portion in the shoulder blocks with the larger block width, the difference in the ground contact surface area amongst the shoulder blocks may be reduced, the difference in the ground reaction force may be reduced, and the tire uniformity may be enhanced.

BRIEF DESCRIPTION OF DRAWINGS

FIG. 2A is a drawing in which a squared portion having a radius of curvature of 10 mm or less, a squared portion taper cut along a straight line having a length of 10 mm or less, and a rounded portion having a radius of curvature of 30 mm or greater are superimposed on top of one another.

FIG. 2B is an explanatory drawing illustrating the squared portion having a radius of curvature of 10 mm or less.

FIG. 2C is an explanatory drawing illustrating the squared portion taper cut along a straight line having a length of 10 mm or less.

FIG. 2D is an explanatory drawing illustrating the rounded portion having a radius of curvature of 30 mm or greater.

FIG. 3 is a table showing test results of the conventional example and the working examples.

DETAILED DESCRIPTION

Description is given below of an embodiment of the present technology with reference to the drawings.

Figure 1:
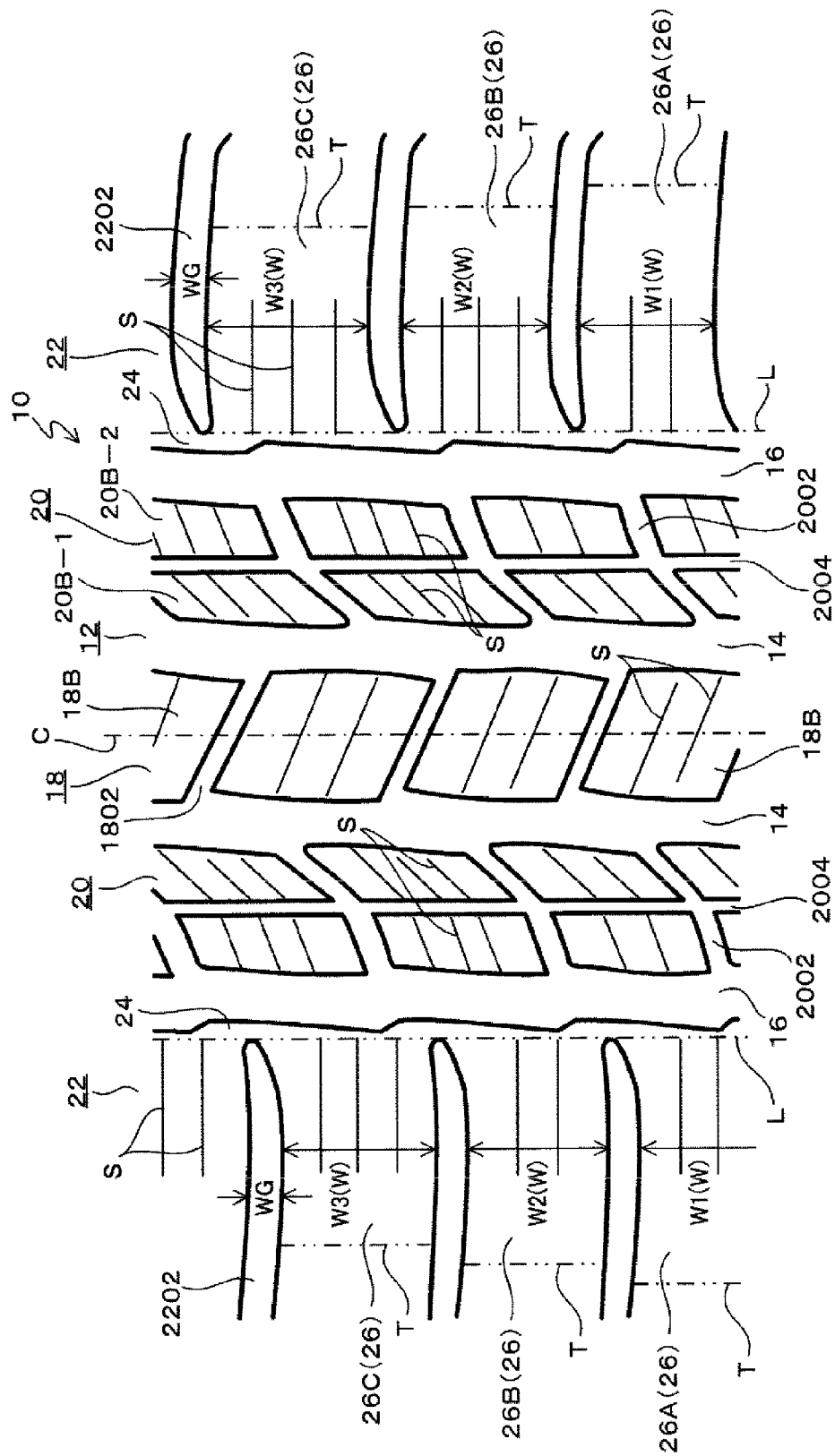
FIG. 1 is a development view illustrating a tread portion of the present embodiment.

A pneumatic tire 10 of the present embodiment is an all-season tire including a left-right asymmetrical tread pattern and having a designated mounting orientation with respect to a vehicle, as illustrated in the development view of the tread pattern in FIG. 1.

The pneumatic tire 10 is provided, in a tread portion 12, with a pair of crown circumferential main grooves 14 extending in the tire circumferential direction on either side of a tire equator C and a pair of shoulder circumferential main grooves 16 extending in the tire circumferential direction on the outer side of the crown circumferential main grooves 14 in the tire width direction.

In the tread portion 12, a crown land portion 18 is disposed between the pair of crown circumferential main grooves 14, middle land portions 20 are disposed between the crown circumferential main grooves 14 and the shoulder circumferential main grooves 16, and shoulder land portions 22 are disposed between the shoulder circumferential main grooves 16 and tread ground contact edges T.

In the crown land portion 18, crown lateral grooves 1802 are disposed at intervals in the tire circumferential direction and extend in a direction that intersects with the tire circumferential direction. The ends of the crown lateral grooves 1802 communicate with the pair of crown circumferential main grooves 14.

Consequently, the crown land portion 18 has a configuration in which crown blocks 18B defined by the crown lateral grooves 1802 are arranged in the tire circumferential direction. In the crown blocks 18B, sipes S are formed.

In the middle land portions 20, middle lateral grooves 2002 are disposed at intervals in the tire circumferential direction and extend in a direction that intersects with the tire circumferential direction, and middle circumferential narrow grooves 2004 are disposed in an intermediate portion of the middle land portions 20 in the tire width direction and extend in the tire circumferential direction. The ends of the middle lateral grooves 2002 communicate with the crown circumferential main grooves 14 and the shoulder circumferential main grooves 16.

Consequently, the middle land portions 20 have a configuration in which inner middle blocks 20B-1 defined by the crown circumferential main grooves 14, the middle circumferential narrow grooves 2004, and the middle lateral grooves 2002 and outer middle blocks 20B-2 defined by the shoulder circumferential main grooves 16, the middle circumferential narrow grooves 2004, and the middle lateral grooves 2002 are distinctly arranged in the tire circumferential direction. In the inner middle blocks 20B-1 and the outer middle blocks 20B-2, the sipes S are formed.

In the shoulder land portions 22, shoulder lateral grooves 2202 are disposed at intervals in the tire circumferential direction and extend in the tire width direction. The inner end of the shoulder lateral grooves 2202 in the tire width direction does not communicate with the shoulder circumferential main grooves 16.

In the shoulder land portions 22, ribs 24, and shoulder blocks 26 are formed defined by the shoulder lateral grooves 2202.

The ribs 24 extend in the tire circumferential direction along the outer side of the shoulder circumferential main grooves 16 in the tire width direction.

The shoulder blocks 26 extend from the ribs 24 to the outer side in the tire width direction and are arranged in the tire circumferential direction sandwiched by adjacent shoulder lateral grooves 2202 in the tire circumferential direction. In the shoulder blocks 26, the sipes S are formed.

Note that in the present technology, "shoulder blocks 26" refer to portions sandwiched by the shoulder lateral grooves 2202 and includes configurations in which portions of the shoulder blocks 26 are connected via the ribs 24, as in the present embodiment, and configurations in which the shoulder blocks 26 are completed separated from one another. More specifically, "shoulder blocks 26" refer to portions sandwiched by adjacent shoulder lateral grooves 2202 in the circumferential direction positioned between imaginary lines L extending in the tire circumferential direction that connect the inner ends of the plurality of shoulder lateral grooves 2202 and the tread ground contact edges T.

Note that the length of the shoulder lateral grooves 2202 in the tire ground contact surface is preferably equal to or greater than 70% of the ground contact width of the shoulder blocks 26 in order to ensure performance on snow.

The shoulder blocks 26 have a block width W measured in the tire circumferential direction.

The block width W may be set as any one of two or more differing values.

In the present embodiment, any one of three differing values corresponding to W1, W2, W3 is used for the value of the block width W. Note that a width WG of the plurality of shoulder lateral grooves 2202 in the tire circumferential direction is set corresponding to the block width W (W1, W2, W3). The shoulder lateral grooves 2202 with a smaller width WG are disposed adjacent to the shoulder blocks 26 with a smaller width W, and the shoulder lateral grooves 2202 with a larger width WG are disposed adjacent to the shoulder blocks 26 with a larger width W. As a result, the ground contact surface area may be equalized across the shoulder land portion 22 in the tire circumferential direction, and tire uniformity may be enhanced.

The cross-sectional shape of the tread ground contact edge T of shoulder blocks 26A with width W1 (the smallest block width W value) when sectioned in a plan that includes the tire axial center is formed with a squared portion 34, as illustrated in FIG. 2. The squared portion 34 is either formed by a curved line 30 having a radius of curvature R of 10 mm or less or taper cut along a straight line 32 having a length of 10 mm or less.

The squared portion 34 having the cross-sectional shape taper cut along the straight line 32 having the length of 10 mm or less is included as a squared portion 34 because such a configuration can ensure the length of the shoulder lateral grooves 2202 and can be expected to have effects on performance on snow in a similar manner to that of the squared portion 34 formed by the curved line 30 having a radius of curvature R of 10 mm or less.

In addition, the cross-sectional shape of the tread ground contact edge T of shoulder blocks 26C with a width W3 (the largest block width W value) when sectioned in the plan that includes the tire axial center is formed with a rounded portion 38 formed by a curved line 36 having a radius of curvature R of from 30 mm to 60 mm both inclusive. The rounded portion 38 can be expected to have effects on rut performance.

Figure 2A:
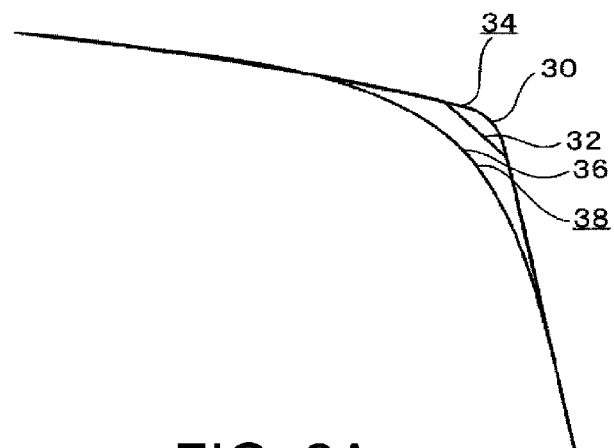
FIGS. 2A to 2D are explanatory drawings illustrating a ground contact edge of a shoulder block.
Figure 2B:
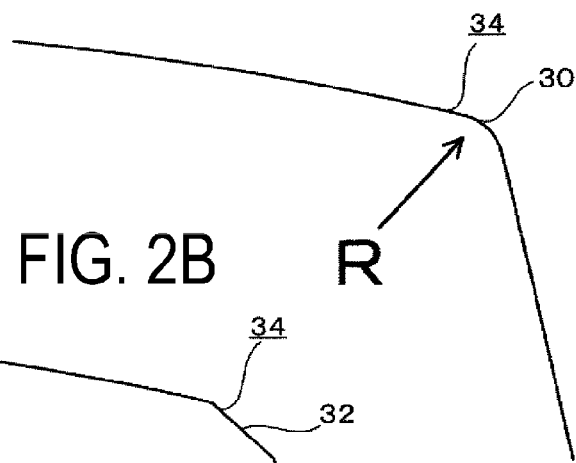
Figure 2C:
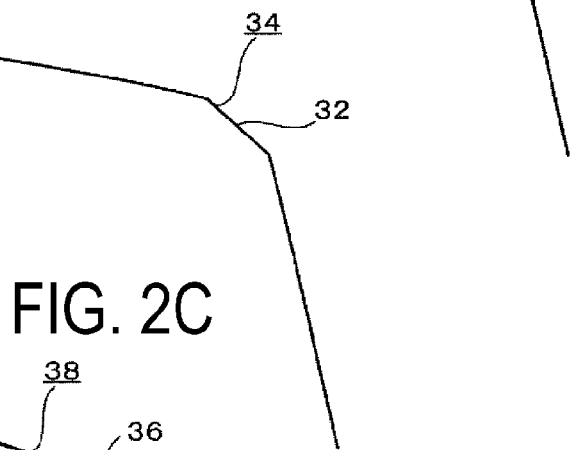
Figure 2D:
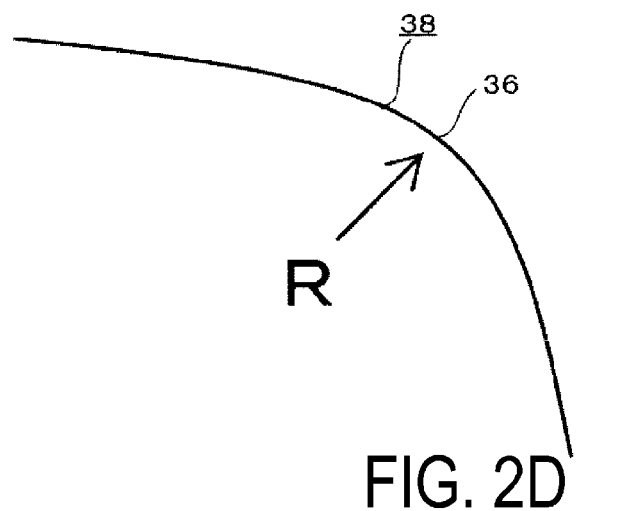

In addition, as illustrated in FIG. 1 and FIG. 2A, the tread ground contact edge T of the squared portion 34 is positioned further to the outer side in the tire width direction than the tread ground contact edge T of the rounded portion 38.

Due to such a configuration in which both the squared portion 34 that ensures the length of the shoulder lateral grooves 2202 and the rounded portion 38 superior in antitramlining properties are used, performance on snow and rut performance may be enhanced.

Moreover, by providing the squared portion 34 in the shoulder blocks 26 with the smaller block width W and providing the rounded portion 38 in the shoulder blocks 26 with the larger block width W, the difference in the ground contact surface area (or difference in block rigidity) amongst the shoulder blocks 26 may be reduced, the difference in the ground reaction force may be reduced, and the tire uniformity may be enhanced.

The cross-sectional shape of the tread ground contact edge of shoulder blocks 26B with the width W2 (the block width W with a value between the smaller block width W value of the width W1 and the larger block width W value of the width W3) when sectioned in the plan that includes the tire axial center is formed by a curved line having a radius of curvature greater that the radius of curvature R of the shoulder blocks 26A and less than the radius of curvature R of the shoulder blocks 26C.

In addition, the tread ground contact edge T of the shoulder blocks 26B with the width W2 (intermediate value) is positioned further to the inner side of the tread ground contact edge T of the shoulder blocks 26A in the tire width direction and further to the outer side of the tread ground contact edge T of the shoulder blocks 26C in the tire width direction.

The shoulder blocks 26 are disposed in the tire circumferential direction in the following order: the shoulder block 26A, 26B, 26C, 26A, 26B, 26C, 26A, 26B, 26C, . . . , . . . . Alternatively, the shoulder blocks 26 are disposed in the following order: the shoulder block 26A, 26B, 26C, 26B, 26A, 26B, 26C, 26B, 26A, . . . , . . . .

In such a manner, the radius of curvature of the curved line R that forms the cross-sectional shape of the tread ground contact edge T of the shoulder blocks 26 when sectioned in the plan that includes the tire axial center and the position of the tread ground contact edge T in the tire width direction are changed in a stepwise manner at each shoulder block 26 arranged in the tire circumferential direction to enhance the tire uniformity.

In such a case, the cross-sectional shape of the tread ground contact edge T of the shoulder blocks 26B with the width W2 (intermediate block width W value) when sectioned in the plan that includes the tire axial center may be formed by the curved line 30 having an radius of curvature greater than that of the shoulder blocks 26A and equal to or less than 10 mm. Alternatively, the cross-sectional shape may be formed with the squared portion 34 taper cut along the straight line 32 having a length greater than that of the shoulder blocks 26A and equal to or less than 10 mm.

The cross-sectional shape of the tread ground contact edge T of the shoulder blocks 26B with the width W2 (intermediate block width W value) when sectioned in the plan that includes the tire axial center may even be formed with the rounded portion 38 formed by the curved line 36 having a radius of curvature less than that of the shoulder blocks 26C and from 30 mm to 60 mm both inclusive.

In the case in which all of the cross-sectional shapes of the tread ground contact edge T of the shoulder blocks 26 described above are formed with the squared portion 34 formed by the curved line 30 having a radius of curvature of 10 mm or less or the rounded portion 38 formed by the curved line 36 having a radius of curvature of from 30 mm to 60 mm both inclusive, the values of the block widths W are categorized into N (N represents an integer of three or greater) differing types. When the shoulder blocks 26 of N types are arranged so that the values are in order from low to high, the radius of curvature SHR(i) of the tread ground contact edge T of the i-th shoulder block 26 in the tire circumferential direction satisfies the relationship SHR(i−1)<SHR(i)<SHR(i+1), where i is an integer equal to or greater than 2 and equal to or less than N. As a result, the cross-sectional shape of the tread ground contact edge T of the shoulder blocks 26 changes in a stepwise manner, which is advantageous in terms of enhancing tire uniformity.

Here, "tread ground contact edge T" refers to the end portions of the entire width of the tread.

"Entire width of the tread (tire ground contact width)" refers to the maximum width in the tire width direction of a tire ground contact region in which the tread surface of the pneumatic tire 10 contacts the road surface when the pneumatic tire 10 is installed on a regular rim, inflated to a regular internal pressure, and 70% of a regular load is applied. Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). The "regular internal pressure" refers to "maximum air pressure" defined by JATMA, a maximum value in "tire load limits at various cold inflation pressures" defined by TRA, or "inflation pressures" stipulated by ETRTO. Note that "regular load" refers to "maximum load capacity" defined by JATMA, a maximum value in "tire load limits at various cold inflation pressures" defined by TRA, and "load capacity" defined by ETRTO.

In addition, by satisfying the relationship $0.95 \leq A2/A1 \leq 1.05$, where A1 is the ground contact surface area of the shoulder blocks 26 with the smallest block width W value and A2 is the ground contact surface area of the shoulder blocks 26 with the largest block width W value, the difference between the ground contact surface area of each of the shoulder blocks 26 is reduced and the ground contact surface area of each of the shoulder blocks 26 is equalized. As a result, the difference between the ground reaction force of each of the shoulder blocks 26 is reduced which is advantageous in terms of enhancing tire uniformity.

In addition, satisfying the relationship $1.3 \leq Lmax/Lmin \leq 1.5$, where Lmin is the smallest block width W value and Lmax is the largest block width W value is advantageous in terms of enhancing tire uniformity and reducing tire pattern noise.

EXAMPLES

FIG. 3 is a table showing test results for pneumatic tires 10 according to embodiments.

For the test tires, all-season tires with a tire size of 265/70R17 113T were used. Four tires were inflated to an internal pressure of 200 kPa and installed on a 17×8J rim of a four-wheel drive RV wagon. The RV wagon was then driven on a test course.

Braking Performance on Snow

Stopping distance when braking from an initial speed of 40 km/h on a snowy road surface was measured, and the results were taken as an index. A greater index value indicates superior braking performance on snow.

Rut Performance

Sensory evaluation was performed after driving at 40 km/h on a road surface with ruts. The results were taken as an index. A greater index value indicates superior rut performance (anti-tramlining performance).

Pattern Noise

Sensory evaluation was performed after driving at 80 km/h on a level road surface. The results were taken as an index. A greater index value indicates less pattern noise.

Uniformity

Radial Force Variation (RFV) was measured in accordance with Japanese Industrial Standards (JIS) D4233. The results were taken as an index. A greater index value indicates superior uniformity.

For Conventional Example 1 and Working Examples 1 to 7, the tread pattern illustrated in FIG. 1 was used. The number of types of block width W values, the number of shoulder blocks 26, the block width W, the block width ratio Lmax/Lmin, the radius of curvature SHR of the tread ground contact edge, the ground contact surface area ratio A2/A1 were set as indicated in the rows of FIG. 3.

Here, the block width ratio Lmax/Lmin is a ratio Lmax/Lmin, where Lmin is the smallest block width W value and Lmax is the largest block width W value.

The radius of curvature SHR is the radius of curvature of the curved line that forms the cross-sectional shape of the tread ground contact edge when sectioned in the plan that includes the tire axial center.

The ground contact surface area ratio A2/A1 is the ratio A2/A1, where A1 is the ground contact surface area of the shoulder blocks 26 with the smallest block width W value, and A2 is the ground contact surface area of the shoulder blocks 26 with the largest block width W value.

The ground contact edges of the shoulder blocks 26 of the Conventional Example were all squared portions 34. As a result, although enhancements in performance on snow and uniformity were seen, rut performance was decreased.

Working Example 1 had two types of block width W values for the shoulder blocks 26 aligned in the tire circumferential direction. The shoulder blocks 26 with the differing block widths W were alternately arranged in the tire circumferential direction.

Working Example 2 had two types of block width W values for the shoulder blocks 26 aligned in the tire circumferential direction. Two of the shoulder blocks 26 with the smaller block width W were disposed consecutively in the tire circumferential direction followed by one of the shoulder blocks 26 with the larger block width W.

Working Examples 3 to 7 had three types of block width W values for the shoulder blocks 26 aligned in the tire circumferential direction. The three shoulder blocks 26A, 26B, 26C of differing block widths W were arranged aligned in the tire circumferential direction in the order: shoulder block 26A, 26B, 26C, 26A, 26B, 26C, 26A, 26B, 26C, . . . , . . . .

The cross-sectional shape of the tread ground contact edge T of the shoulder blocks 26 of Working Examples 6 and 7 were all formed with squared portions 34 formed by the curved line 30 having a radius of curvature of 10 mm or less or rounded portions 38 formed by the curved line 36 having a radius of curvature of from 30 mm to 60 mm both inclusive.

By comparing the Conventional Example to Working Examples 1 to 7, it can be seen that Working Examples 1 to 7 have enhanced rut performance and uniformity over the Conventional Example while also maintaining a similar level of performance on snow.

From Working Example 1 and Working Example 2, it can be seen that in the case of having two types of block width W value for the shoulder blocks 26 aligned in the tire circumferential direction, changing the order in which the shoulder blocks 26 are arranged in the tire circumferential direction results in variances in rut performance and tire uniformity.

From Working Example 1 and Working Examples 3, 6, 7, it can be seen that in the case in which the block width ratio Lmax/Lmin and the ground contact surface area ratio A2/A1 are common amongst the examples, rut performance and uniformity are enhanced more by having three types of block width W values for the shoulder blocks 26 and arranging the shoulder blocks 26 so that the radius of curvature SHR of the ground contact edge changes in a stepwise manner than by having two types of block width W values for the shoulder blocks 26 and alternately arranging the two types of shoulder blocks 26 in the tire circumferential direction.

From the Working Examples 3, 4, 6, 7 with three types of block width W values, it can be seen that in the case in which the block width ratio Lmax/Lmin is common amongst the examples, tire uniformity is enhanced by increasing the ground contact surface area ratio A2/A1.

Working Example 5, in which three types of block width W values were set, the block width ratio Lmax/Lmin was the largest, and the ground contact surface area ratio A2/A1 was the largest, had reduced pattern noise and the most enhanced uniformity.

The invention claimed is:

1. An all-season tire comprising:
 a shoulder circumferential main groove extending in a tire circumferential direction in a tread surface of the tire;
 a plurality of shoulder lateral grooves disposed to an outer side of the shoulder circumferential main groove in a tire width direction at intervals in the tire circumferential direction and extending in the tire width direction; and
 a plurality of shoulder blocks arranged in the tire circumferential direction and constituting a shoulder portion of a tread portion, each of the shoulder blocks being sandwiched by adjacent shoulder lateral grooves in the tire circumferential direction,
 the plurality of shoulder blocks being formed with two types of differing values for a block width measured in the tire circumferential direction,
 the shoulder blocks of the differing block widths being alternately disposed in the tire circumferential direction in a certain order,
 a cross-sectional shape of a tread ground contact edge of the shoulder blocks with the smaller block width value when sectioned in a plan that includes a tire axial center being formed with a squared portion taper cut along a straight line having a length of 10 mm or less,
 a cross-sectional shape of a tread ground contact edge of the shoulder blocks with the larger block width value when sectioned in the plan that includes the tire axial center being formed with a rounded portion formed by a curved line having a radius of curvature of from 30 mm to 60 mm both inclusive, the tread ground contact edge of the squared portion being positioned further to the outer side in the tire width direction than the tread ground contact edge of the rounded portion, and the shoulder lateral grooves including shoulder lateral grooves with a smaller width in the tire circumferential direction and shoulder lateral grooves with a larger width in the tire circumferential direction, the shoulder lateral grooves with the smaller width in the tire circumferential direction being disposed adjacent to the shoulder blocks with the smaller block width value, and the shoulder lateral grooves with the larger width in the tire circumferential direction being disposed adjacent to the shoulder blocks with the larger block width value, so as to equalize a ground contact surface area in the tire circumferential direction of portions at which the shoulder blocks are provided.

2. An all-season tire comprising:

a shoulder circumferential main groove extending in a tire circumferential direction in a tread surface of the tire;

a plurality of shoulder lateral grooves disposed to an outer side of the shoulder circumferential main groove in a tire width direction at intervals in the tire circumferential direction and extending in the tire width direction; and a plurality of shoulder blocks arranged in the tire circumferential direction and constituting a shoulder portion of a tread portion, each of the shoulder blocks being sandwiched by adjacent shoulder lateral grooves in the tire circumferential direction, the plurality of shoulder blocks being formed with any one of three or more types of values for a block width measured in the tire circumferential direction, the three or more types including a smaller block width value, a larger block width value, and one or more types of values between the smaller and larger values, a cross-sectional shape of a tread ground contact edge of the shoulder blocks with the smaller block width value when sectioned in a plan that includes a tire axial center being formed with a squared portion taper cut along a straight line having a length of 10 mm or less, a cross-sectional shape of a tread ground contact edge of the shoulder blocks with the larger block width value when sectioned in the plan that includes the tire axial center being formed with a rounded portion formed by a curved line having a radius of curvature of from 30 mm to 60 mm both inclusive, a cross-sectional shape of a tread ground contact edge of the shoulder blocks with the intermediate block width value when sectioned in the plan that includes the tire axial center being formed with a squared portion taper cut along a straight line having a length of 10 mm or less but larger than the straight line of the squared portion of the shoulder blocks with the smaller block width value, the tread ground contact edge of the squared portion of the shoulder blocks with the smaller block width value being positioned further to the outer side in the tire width direction than the tread ground contact edge of the rounded portion, the tread ground contact edge of the shoulder blocks with the intermediate block width value being positioned both further to an inner side in the tire width direction than the ground contact edge of the squared portion of the shoulder blocks with the smaller block width value and further to the outer side in the tire width direction than the ground contact edge of the rounded portion, the plurality of shoulder blocks being disposed so that the cross-sectional shape of the tread ground contact edge of the shoulder blocks when sectioned in the plan that includes the tire axial center and the position of the tread ground contact edge in the tire width direction change in a stepwise manner in the tire circumferential direction, and the shoulder lateral grooves including shoulder lateral grooves with a smaller width in the tire circumferential direction, shoulder grooves with an intermediate width in the tire circumferential direction, and shoulder lateral grooves with a larger width in the tire circumferential direction, the shoulder lateral grooves with the smaller width in the tire circumferential direction being disposed adjacent to the shoulder blocks with the smaller block width value, the shoulder lateral grooves with the larger width in the tire circumferential direction being disposed adjacent to the shoulder blocks with the larger block width value, and the shoulder lateral grooves with the intermediate width in the tire circumferential direction being disposed adjacent to the shoulder blocks with the intermediate block width value, so as to equalize a ground contact surface area in the tire circumferential direction of portions at which the shoulder blocks are provided.

3. The all-season tire according to claim 1, wherein a relationship $0.95 \leq A2/A1 \leq 1.05$ is satisfied, where A1 is a ground contact surface area of the shoulder blocks with the smaller block width value, and A2 is a ground contact surface area of the shoulder blocks with the larger block width value.

4. The all-season tire according to claim 3, wherein a relationship $1.3 \leq Lmax/Lmin \leq 1.5$ is satisfied, where Lmin is the smaller block width value, and Lmax is the larger block width value.

5. The all-season tire according to claim 2, wherein a relationship $0.95 \leq A2/A1 \leq 1.05$ is satisfied, where A1 is a ground contact surface area of the shoulder blocks with the smaller block width value, and A2 is a ground contact surface area of the shoulder blocks with the larger block width value.

6. The all-season tire according to claim 5, wherein a relationship $1.3 \leq Lmax/Lmin \leq 1.5$ is satisfied, where Lmin is the smaller block width value, and Lmax is the larger block width value.

7. The all-season tire according to claim 1, wherein a relationship $1.3 \leq Lmax/Lmin \leq 1.5$ is satisfied, where Lmin is the smaller block width value, and Lmax is the larger block width value.

* * * * *